(12) United States Patent
Marcheschi

(10) Patent No.: US 6,625,958 B1
(45) Date of Patent: Sep. 30, 2003

(54) METHOD AND APPARATUS FOR TRANSFERRING PRODUCTS FROM A MANUFACTURING UNIT TO A PACKAGING UNIT

(75) Inventor: Vittoriano Marcheschi, Lappato (IT)

(73) Assignee: Zanchetta & C. S.r.L., Lucca (IT)

( * ) Notice: Subject to any disclaimer, the term of this patent is extended or adjusted under 35 U.S.C. 154(b) by 0 days.

(21) Appl. No.: 09/558,045

(22) Filed: Apr. 26, 2000

(30) Foreign Application Priority Data

May 6, 1999 (IT) .......................... B099A0229

(51) Int. Cl.⁷ ................................................ B65D 1/09
(52) U.S. Cl. ............................ 53/471; 53/425; 53/489; 53/111 R
(58) Field of Search ...................... 53/425, 428, 111 R, 53/510, 471, 489

(56) References Cited

U.S. PATENT DOCUMENTS

| | | | | |
|---|---|---|---|---|
| 3,951,461 A | * | 4/1976 | De Feudis ................... | 406/10 |
| 3,984,254 A | * | 10/1976 | Alexandrov et al. ........ | 134/116 |
| 4,395,164 A | | 7/1983 | Beltrop et al. | |
| 4,466,761 A | * | 8/1984 | Beltrop et al. ............... | 406/112 |
| 5,024,675 A | * | 6/1991 | Stackpool et al. .......... | 222/593 |

FOREIGN PATENT DOCUMENTS

| | | | |
|---|---|---|---|
| DE | 12 59 792 | 12/1965 | |
| DE | 1259792 | * 1/1968 | .................. 81/153 |
| DE | 197 14 507 | 10/1998 | |
| EP | 376668 | 7/1990 | |
| IT | B096A000229 | 5/1996 | |

\* cited by examiner

Primary Examiner—Rinaldi I. Rada
Assistant Examiner—Gloria R. Weeks
(74) Attorney, Agent, or Firm—Fay, Sharpe, Fagan, Minnich & McKee, LLP (57) ABSTRACT

Method for transferring products from a manufacturing unit to a packaging unit, comprising at least the phases of feeding a determined quantity of said product coming from said manufacturing unit, preventing contact between the product and the external environment, inside a hermetic containment case comprising a sealing opening and, respectively, closing stopper, located in correspondence with a station for filling a first loading device, transferring pneumatically and along a first determined route said full case from said first loading device to a station for receiving a second off-loading device, through first sealed pneumatic transfer means able to connect pneumatically, preventing contact between the case and the external environment, said first loading device to said second off-loading device, off-loading said determined quantity of said product from said case inside said packaging unit preventing contact between the product and the external environment.

26 Claims, 5 Drawing Sheets

METHOD AND APPARATUS FOR TRANSFERRING PRODUCTS FROM A MANUFACTURING UNIT TO A PACKAGING UNIT

BACKGROUND OF THE INVENTION

The present invention relates to a method and an apparatus for transferring products from a manufacturing unit to a packaging unit.

In particular, the present invention relates to a method and an apparatus for transferring chemical and/or pharmaceutical products from a manufacturing unit, for instance a compressing machine, able to receive the chemical-pharmaceutical product in the form of incoherent material such as powders, fine-grain granules and the like and to reduce it to tablets, pills, capsules and the like, towards a packaging unit, constituted by a blistering machine, able to form bubble packages, known with the term "blisters" and destined to contain the aforementioned tablets, pills, capsules and the like.

In the technical field relating to the plants used by the pharmaceutical industry for transferring the related chemical-pharmaceutical products, the aforesaid incoherent material is placed inside appropriate containers which are located in a storage area called "technical area" positioned at a determined first level which is at a relative height greater than that of a second lower level called "production area" wherein the manufacturing unit comprising the aforementioned compressing machine is usually situated.

The flow of the incoherent material from the upper container to the lower compressing machine occurs by gravity and usually presents problems, closely linked to the need to maintain a strict separation between the technical area and the production area in order to prevent the spreading of the dusts into the environment, a crossed contamination between the two aforesaid areas, as well as the perfect cleanliness of the related devices used to off-load the incoherent material from the container to the underlying machine.

For this purpose the same Applicant has filed an application for a European patent with publication number EP 0 810 170, whose content is introduced herein, and relating to a connecting device between the container and the compressing machine and comprising connecting means between the two levels, constituted by a rigid cylindrical conduit positioned vertically, within which is coaxially inserted a cartridge, comprising a tubular sack made of Polyethylene, of the disposable kind, having its own extremities respectively connected to the discharge outlet of the container and to the loading inlet of a hopper of the compressing machine.

The emptying of the container takes place by the passage of the incoherent material contained in the container itself through the tubular sack, which must be connected hermetically to the container and to the hopper in order not to let the material be released, thereby preventing its dispersion into the environment.

For the closure of the tubular sack, as well as for the closure of the container, fastening means are used, such as bands or sealing rings, combined with controllable shut-off organs such as butterfly valves and the like.

The aforementioned cylindrical conduit comprises bidirectional means able to slide inside the conduit to allow the translation of the sack from the discharge outlet of the container towards the loading inlet of the hopper. These means comprise a transfer plunger, called "shuttle", which is movable inside the conduit and is connected to the free extremity of the sack.

During its descent phase, the shuttle slowly and progressively unfurls the sack until bringing its free extremity in correspondence with the inlet of the loading hopper of the compressing machine.

It is evident that throughout the off-loading phase the strict separation between the technical area and the production area is maintained, avoiding the aforementioned problems of dispersion of the incoherent material in the surrounding environment and so-called cross-contaminations. To prevent the material from spilling, the tubular sack is closed by a hermetic clip which is removed only once the connection with the compressing machine has been effected. When the off-loading of the container is complete, the tubular sack is heat-sealed and cut in proximity to the aforementioned connection with the compressing machine and is subsequently disposed of, avoiding cleaning operations on the connection conduit itself.

The problems described above are equally encountered during the operations that follow the off-loading of the incoherent material from the container as described above and which are defined by the transfer of the tablets, pills, capsules and the like produced by the compressing machine towards a blistering machine which, usually, in the plants of the pharmaceutical industry, is located relatively far from the compressing machine itself. These problems are obviously connected to the need to prevent the diffusion into the environment of powders, which are inevitably produced during the handling of the tablets, thereby preventing a cross-contamination between the two aforementioned machines, as well as the perfect cleanliness of the related devices used to transfer the tablets, pills and the like produced by the compressing machine to the blistering machine.

SUMMARY OF THE INVENTION

The aim of the present invention is to provide a method and an apparatus able to transfer chemical-pharmaceutical products such as tablets, pills, capsules and the like from a compressing machine to a blistering machine in a simple, economical and rapid manner, avoiding all problems linked with the contamination of the products towards the external environment, with cross-contamination, and with the cleanliness of the devices used to connect the two machines.

In accordance with the present invention a method is provided as claimed in the first claim for a method.

The present invention further relates to an apparatus as claimed in the first claim for an apparatus.

BRIEF DESCRIPTION OF THE DRAWINGS

The present invention shall now be described with reference to the accompanying drawings, which show an embodiment thereof provided purely by way of non limiting example, in which.

DESCRIPTION OF THE PREFERRED EMBODIMENT

Figure 1:
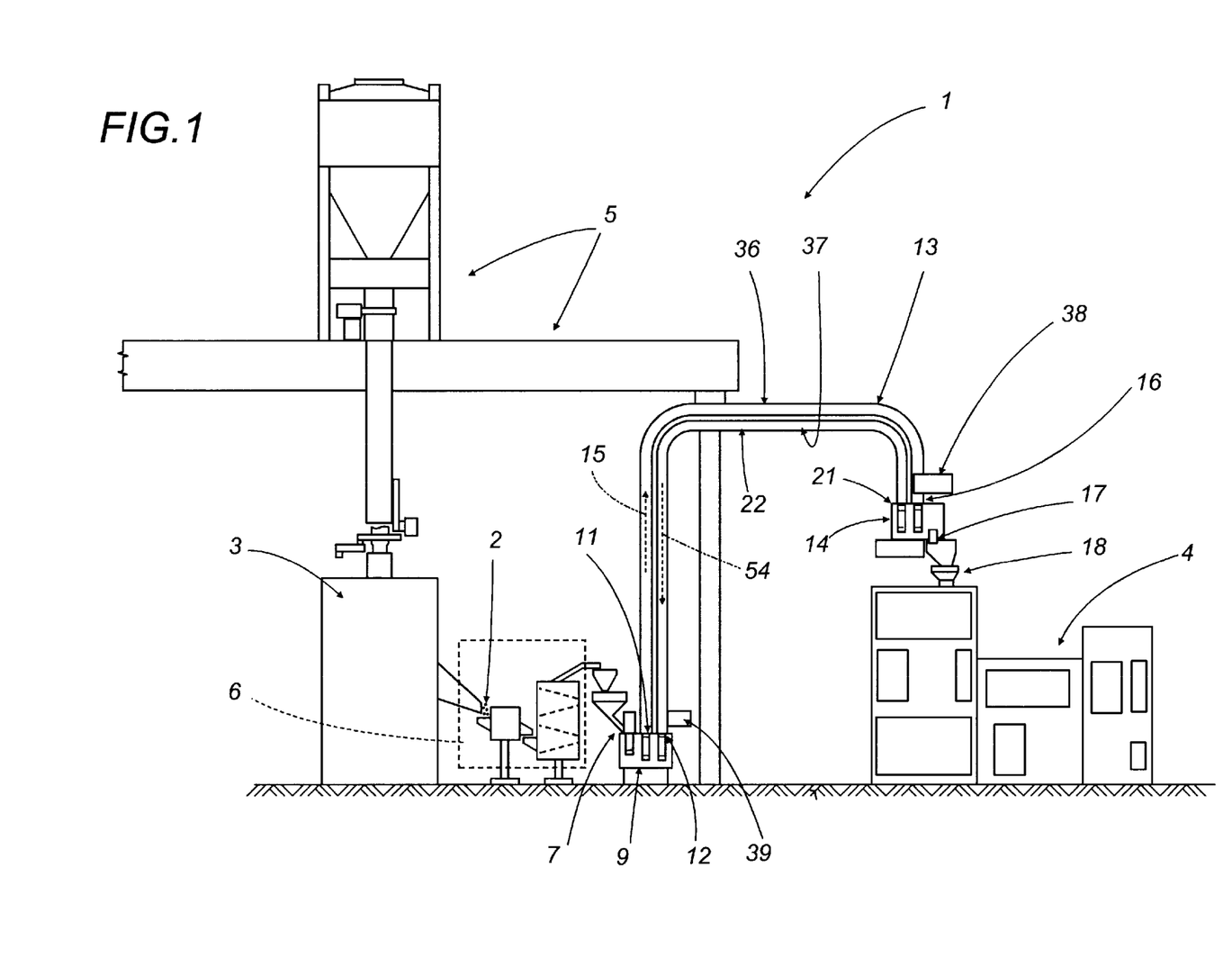
FIG. 1 shows a schematic lateral view of an apparatus for transferring products from a manufacturing unit to a packaging unit.

With reference to FIG. 1, the number 1 globally indicates an apparatus for transferring chemical-pharrnaceutical products 2 such as tablets, pills and the like from a manufacturing unit, such as a compressing machine 3, to a utilization unit, such as, for instance, a packaging unit like a blistering machine 4. The utilizing unit could be constituted, according to an embodiment not shown herein, also by a collection container.

The apparatus 1 is part of a portion of a chemical-pharmaceutical plant indicated in FIG. 1 with the number 5.

In the remainder of the present description, and purely for the sake of simplicity of description, the products 2 shall be indicated by the term "tablets".

The compressing machine 3 comprises first hermetic feeding means, of a known kind and shown schematically with a dashed block 6, which are able to feed the tablets 2 coming from the machine 3 inside a hermetic containment case 7 comprising a hermetic opening and, respectively, closing stopper 8.

Figure 2:
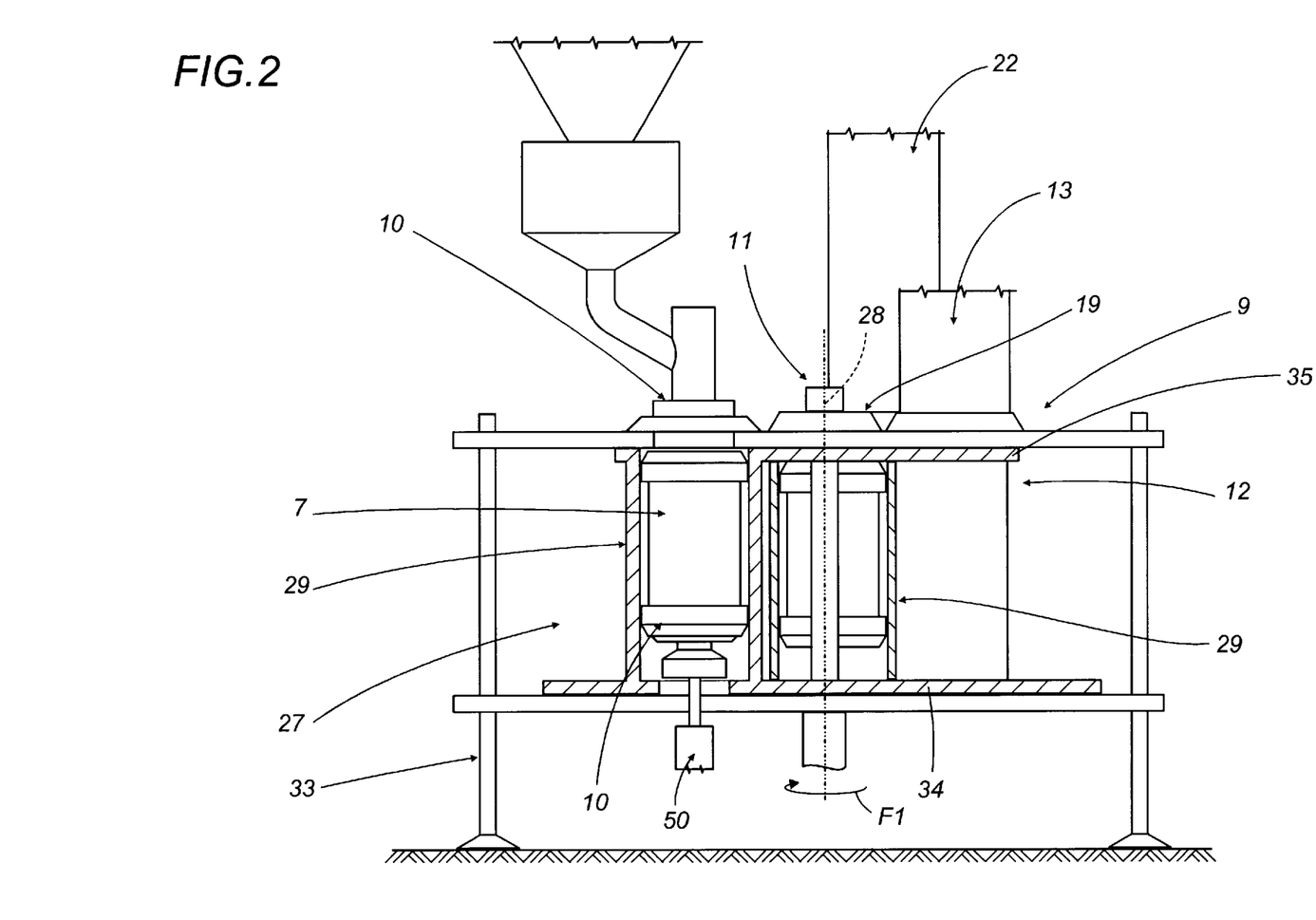
FIG. 2 shows a schematic lateral view, with some parts sectioned and others removed, of a loading or off-loading device of the apparatus of FIG. 1.
Figure 3:
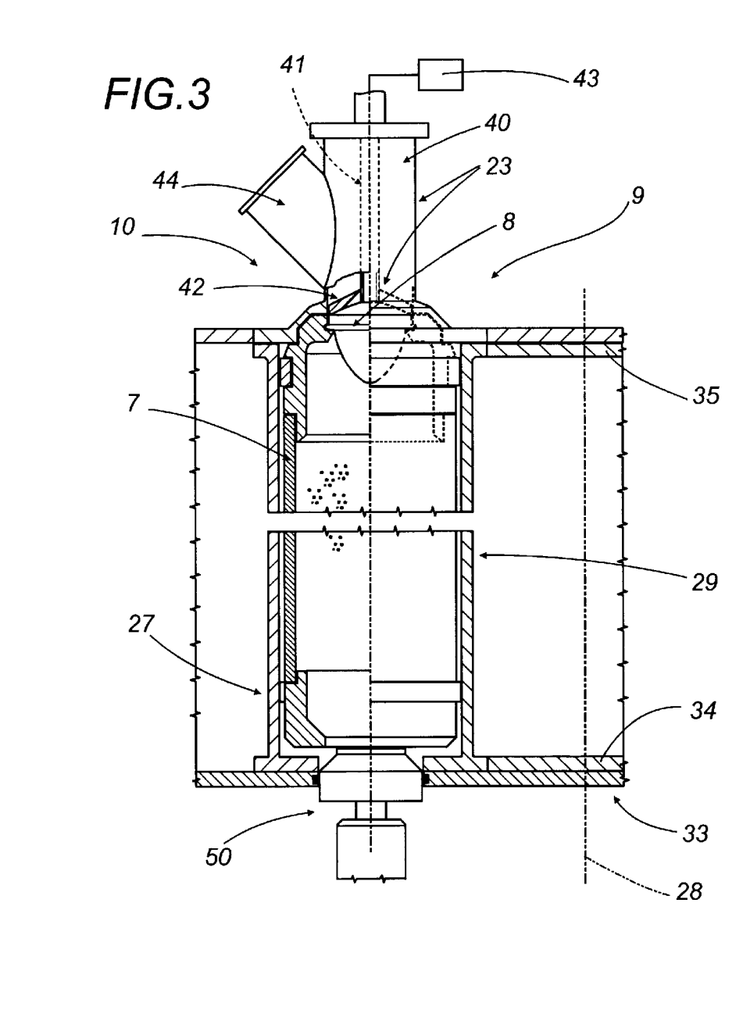
FIG. 3 shows a schematic lateral view, with some parts sectioned and others removed, of the filling station of the device of FIG. 2.

As shown in FIGS. 1 and 2 the apparatus 1 comprises a first loading device 9 comprising at least a filling station 10, shown in FIG. 3 in a more detailed manner, a station 11 for launching and a station 12 for the arrival of the case 7 which comes, as shall be better described hereafter, from a second off-loading device provided in correspondence with the utilization unit 4.

Figure 5:
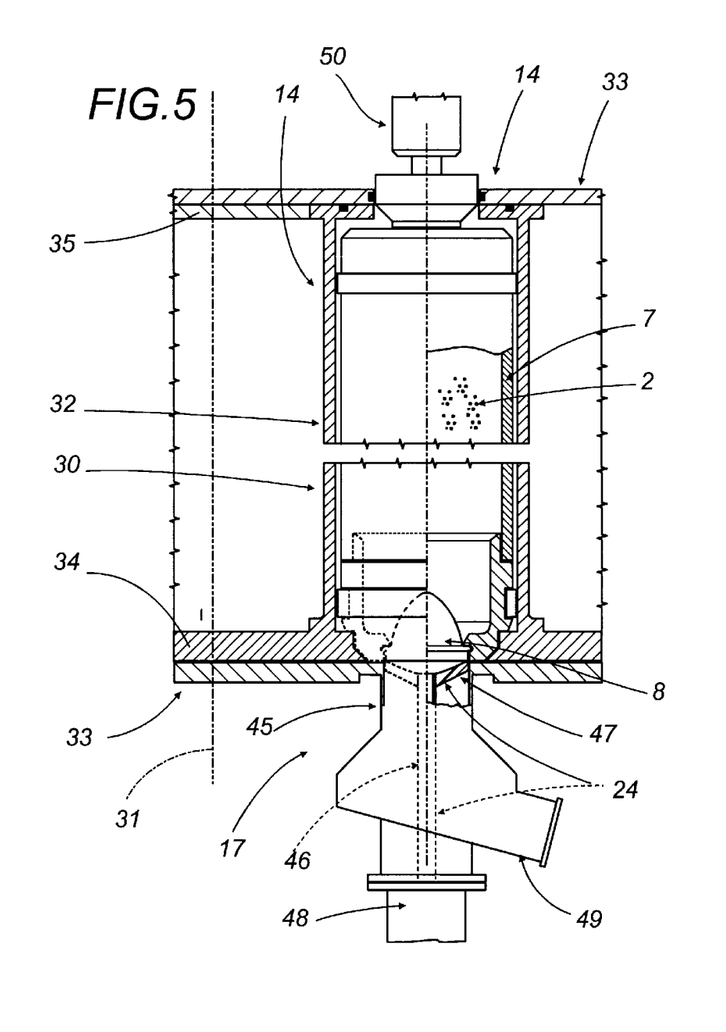
FIG. 5 shows a schematic lateral view, with some parts sectioned and others removed, of the off-loading station of the device of FIG. 7.

The apparatus 1 further comprises first sealed pneumatic transfer means 13 for pneumatically connecting the first loading device 9 and a second off-loading device 14 and for transferring, along a first determined route 15, said full case 7 towards said second off-loading device 14, which comprises at least a respective station 16 for the arrival of said full case 7, connected to said first pneumatic transfer means 13, and an off-loading station 17, shown in a more detailed manner in FIG. 5. In correspondence with said off-loading station 17, the tablets 2 contained inside the case 7 are off-loaded to the utilizing unit 4.

The apparatus 1 also comprises, as shown in FIG. 1, in proximity to the off-loading station 17, second hermetic means 18 for feeding the aforementioned product 2 inside said utilizing unit which, in this case, is schematically shown as a blistering machine 4.

The first loading device 9 further comprises a first washing station 19 to wash said full case 7 externally.

Figure 4:
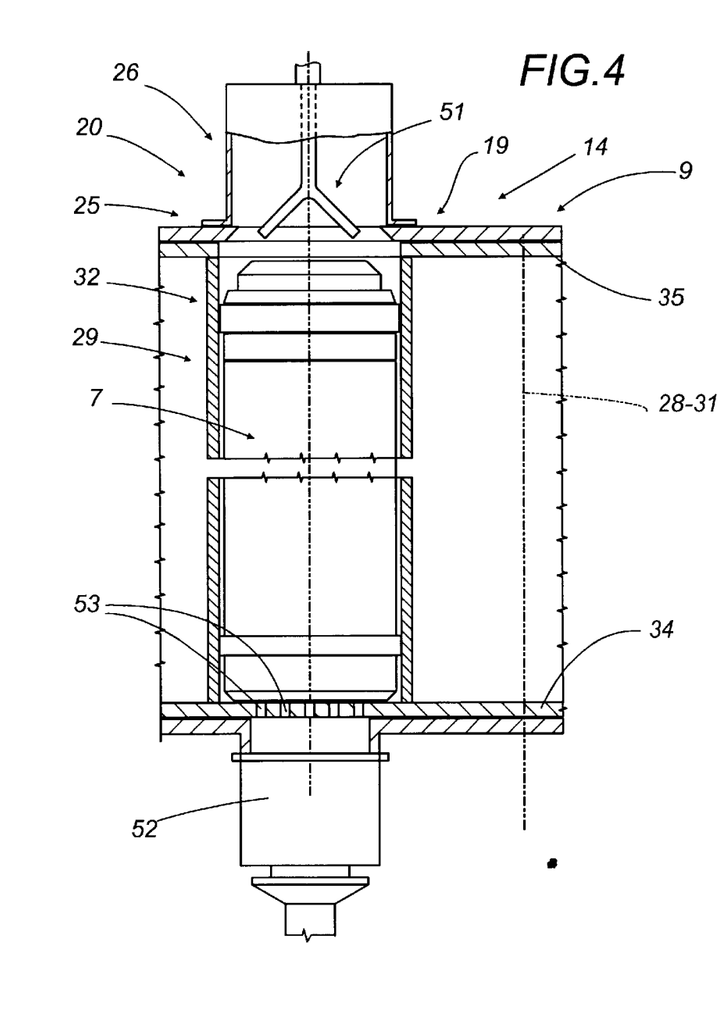
FIG. 4 shows a schematic lateral view, with some parts sectioned and others removed, of the washing station of the devices of FIGS. 2 and 7.
Figures 6, 8:
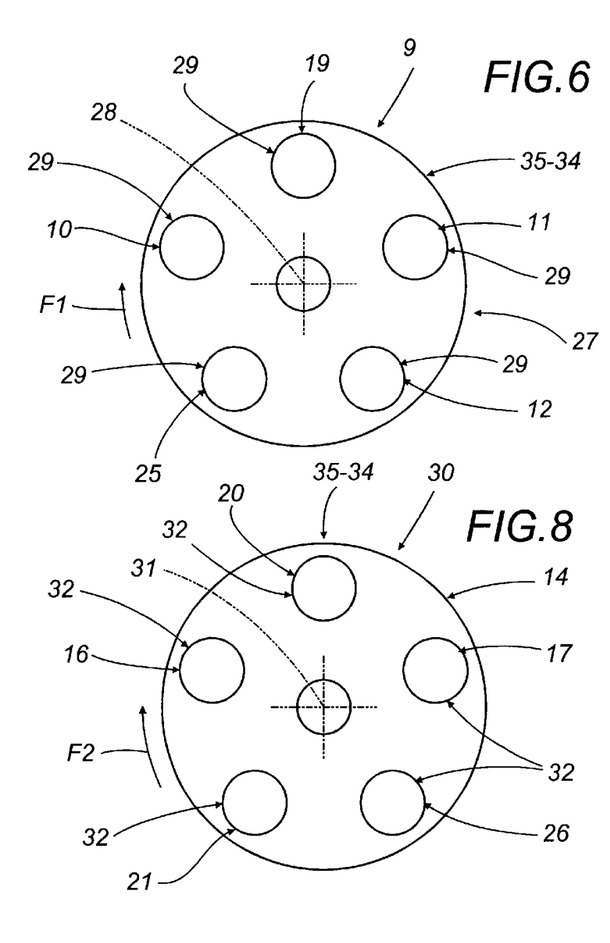
FIG. 6 shows a schematic top view of the loading device of FIG. 2.
FIG. 8 shows a schematic top view of the off-loading device of FIG. 7.
Figure 7:
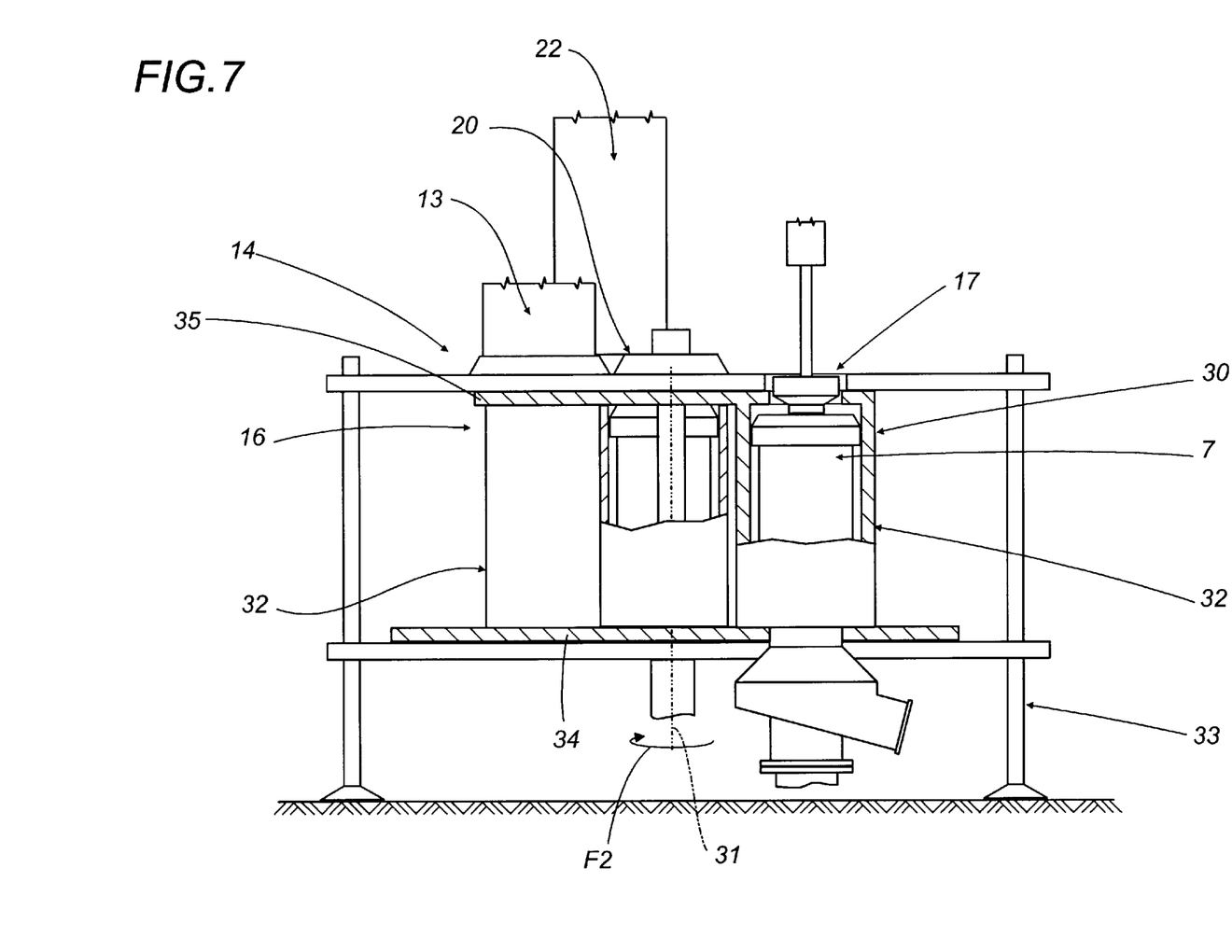
FIG. 7 shows a schematic lateral view, with some parts sectioned and others removed, of an off-loading device of the apparatus of FIG. 1.

As shown in FIGS. 4, 7 and 8, the second off-loading device 14 further comprises a first station 20 for externally washing said empty case 7 and a launch station 21 (as shown also in FIG. 1) connected to second sealed pneumatic transfer means 22 to connect pneumatically said first loading device 9 and said second off-loading device 14 and to transfer, along a second determined route 54, the empty case 7 towards the first loading device 9 in correspondence with the arrival station 12.

As shown in FIGS. 2, 3 and 6, the first loading device 9 comprises first means 23 for opening and closing the stopper 8 of the case 7, which first opening means 23 are positioned in correspondence with said filling station 10.

As shown in FIGS. 5, 7 and 8, the second off-loading device 14 comprises second means 24 for opening and closing the stopper 8 of the case 7, which opening means 24 are positioned in correspondence with said off-loading station 17.

The first loading device 9 comprises a second washing station 25 for washing said empty case 7 coming from said second off-loading device 14.

Similarly, the second off-loading device 14 comprises a second washing station 26 for washing said full case 7 coming from said first loading device 9.

It is essential to note that the first and second washing stations 19, 20 and 25, 26 respectively of said first loading device 9 and second off-loading device 14 are identical to each other and are shown in detail in FIG. 4.

A shown in FIG. 2, the first loading device 9 comprises a first drum 27 able to rotate about a first axis of rotation 28; the first drum 27 comprises a plurality of seats 29 for receiving a respective containment case 7, and is movable cyclically and in succession in intermittent fashion, according to the arrow F1 indicated also in FIG. 6. Following such rotation, the aforementioned seats 29, each of which houses a respective case 7 move, as FIG. 6 clearly shows, between said filling station 10, the first washing station 19 and the launch station 11. This rotation also allows to move said seat 29, left empty after the launch of the full case 7, towards said second off-loading device 14, from the launch station 11 towards the receiving station 12 to receive a case 7 coming from said second off-loading device 14.

The drum 27, continuing in its rotation according to F1, then transfers the empty case 7 towards the aforementioned second washing station 25 and towards the filling station 10.

As shown in FIG. 7, in a manner similar to the one described for the loading device 9, the second off-loading device 14 comprises a second drum 30 substantially identical to the first drum 27 and also able to rotate about a respective second axis of rotation 31. The second drum 30 comprises a plurality of seats 32 identical to the seats 29 of the first drum 27, for receiving a respective containment case 7. The second drum 30 is movable cyclically and in succession in intermittent fashion, according to the arrow F2 indicated also in FIG. 8, to move the seats 32 housing a respective full case 7 coming from the first loading device 9, between said receiving station 16, towards the first washing station 20 and, subsequently towards said off-loading station 17. Once the product 2 has been off-loaded from the case 7, the second drum 30 makes the empty case 7 advance towards said second washing station 26 and towards the launch station 21, as shown in FIG. 8. Moreover, proceeding in its rotation about the axis 31 the second drum 30 moves the seat 32, left empty after the launch of the empty case 7, effected in correspondence with the launch station 21 towards the first loading device 9, from the launch station 21 towards said receiving station 16, in correspondence with which the device 14 receives a case 7 coming from the first loading device 9.

As shown in FIG. 2, the first drum 27 comprises an external frame 33 supporting a first lower disk 34 and a second upper disk 35, mutually distanced, parallel and lying on respective planes of lay positioned orthogonal to the respective first axis of rotation 29, each first and second disk 34, 35 including between them said seats 29.

As shown in the corresponding FIG. 6, the aforementioned stations 12, 25, 10, 19 and 11 are positioned angularly equidistant about the first axis of rotation 28.

In a manner similar to the one described for the first loading device 9, in regard to the second off-loading device 14, as shown in FIG. 7, the related second drum 30 comprises an external frame 33 supporting a first lower disk 34 and a second upper disk 35, mutually distanced, parallel and lying on respective planes of lay positioned orthogonal to said second axis of rotation 31, each first and second disk 34, 35 including between them said seats 32.

As shown in the corresponding FIG. 8, the aforementioned stations 16, 20, 17, 26 and 21 are positioned angularly equidistant about the first axis of rotation 31.

The first and second drum 27, 30 are movable in phase relative to each other and to the respective first and second pneumatic transfer means 13, 22.

As shown in FIG. 1, the first and second pneumatic transfer means 13, 22 comprise, respectively, a first 36 and a second 37 sealed pipeline provide with respective first and second blowing means 38, and 39 able to generate inside each respective pipeline 36, 37 a flow of a fluid necessary for the travel of the case 7 inside each first and second pipeline 36, 37.

As shown in FIG. 3, relating to the loading station 10 of the first loading device 9, the aforementioned first means 23 for opening and closing the stopper 8 of the case 7 comprise a first tubular chamber 40 coaxial to the loading station 10. Inside the first chamber 40 is positioned a first thruster 41 provided, on its extremity destined to come in contact with the stopper 8, with a suction cup 42 connected to respective aspiration means 43. The thruster 41 is movable between a first raised position (not shown) towards a second lowered position for drawing the stopper 8 (shown in FIG. 3), a third raised position for translating said stopper 8, also not shown, in such a way as not to interfere with the flow of the tablets 2 coming from the compressing machine 3 through an additional chamber 44 which enters the first chamber 40. Once the loading of the case 7 is completed, the thruster 41 moves to a fourth lowered position for closing the case 7 with the stopper 8, coinciding with the aforementioned second lowered position for drawing the stopper 8, subsequently to move back to a fifth raised rest position after releasing the stopper 8 in its position of closure of the case 7.

The fifth raised rest position coincides with the aforementioned first position which is such as to allow the rotation of the drum 27 about the axis 28.

As shown in FIG. 5, relating to the off-loading station 17 of the second device 14, the second means 24 for opening and closing the stopper 8 of the case 7 comprise a second tubular chamber 45 coaxial to said loading station 17. Inside said second chamber 45 is positioned a second thruster 46 provided, on its extremity destined to come in contact with the stopper 8, with a respective suction cup 47 connected to respective aspiration means 48. In a manner similar to the one described for the first thruster 41, the second thruster 46 is movable between a first lowered position (not shown) towards a second raised position for drawing the stopper 8 (shown in FIG. 5), a third lowered position (not shown) for translating said stopper 8 in a position not interfering with the flow of the tablets 2 coming from said case 7 and advancing through an additional chamber 49 branching off from the second chamber 45. Once the off-loading of the case 7 is completed, the thruster 46 moves to a fourth raised position for closing the case 7 with the stopper 8, coinciding with the aforementioned second position, subsequently to move to a fifth lowered rest position after releasing the stopper 8 in its position of closure of the case 7. This rest position coincides with the aforementioned first position and is such as to allow the rotation of the drum 30 about its axis 31.

As shown in FIGS. 2, 3, 5 and 7, the first and second opening and closing means 23, 24 comprise respective means 50 for thrusting and actuating the case 7 cooperating with the aforementioned means 23, 24 and such as to allow an actuation along the axis of the respective seat 29, 32 of the case 7 towards and away from the respective means 23, 24.

Both for the first loading device 9, and for the second off-loading device 14, the respective first and second washing stations indicated as 19, 25 and 20, 26 comprise, as shown in FIG. 4, respective means 51 for conveying a washing fluid or liquid inside the seat 29, 32, depending on whether the washing station refers to the drum 27 or to the drum 30.

Downstream of the means 5 1, means 52 are provided for filtering the liquid or fluid that laps the case 7 shot by the conveying means 51 and traversing the holes 53 obtained on the lower disks 34.

As described above, the apparatus comprises a plurality of seats 29, 32, which, according to the embodiment shown in FIGS. 6 through 8, are in the number of five for each drum 27 and 30 in such a way as to handle cyclically a plurality of cases 7 transiting from the first loading device 9 towards the second loading device 14 and vice versa, and in such a way as to move in succession a plurality of said cases 7 between the various loading, off-loading, washing and arrival stations.

According to an alternative embodiment not shown herein, the seats 29 of the loading device 9 and the seats 32 of the off-loading device 14 can be provided in the number of six for each respective drum 27, 30.

This allows, in the initialization phase of the operative cycle of the apparatus 1, to insert six empty cases into the loading drum 27 and five empty cases in the off-loading drum 30, leaving for the latter a seat 32 free and available for any further operative phases on the case, such as the verification of the proper filling and/or emptying, proper washing, etc.

The invention thus conceived can be subject to numerous modifications and variations, without thereby departing from the scope of the inventive concept. Moreover, all components can be replaced by technically equivalent elements.

What is claimed is:

1. Method for transferring products from a manufacturing unit to a packaging unit, comprising at least the phases of feeding a deter mined quantity of said product coming from said manufacturing unit, preventing contact between the product and the external environment, inside into a hermetic containment case comprising a sealing opening and, respectively, closing stopper, located in correspondence with a station for filling a first loading device, transferring pneumatically and along a first determiners route said full case from said first loading device to a station for receiving a second off-loading device, by means of first sealed pneumatic transfer means able to connect pneumatically, preventing contact between the case and the external environment, said first loading device to said second off-loading device, off-loading said determined quantity of said product from said case to the interior of said utilizing unit preventing contact between the product and the external environment, said method further comprising externally washing said full case and said closing stopper.

2. A method as claimed in claim 1, wherein the step of externally washing said full case comprises:

executing an external washing of said full case in a first washing station of said first loading device; and, executing an external washing of said full case in a first washing station of said second off-loading device.

3. A method as in claim 2, comprising the completion in succession and in a discrete manner by means of said first loading device, starting from a condition in which the case has just been filled, of an operative cycle comprising the following phases of moving said full case from said filling station towards said first washing station, moving said full case from said first washing station towards a launch station connected to said first pneumatic transfer means, transferring said full case towards said second off-loading device through said first pneumatic transfer means, moving said empty case, once it has arrived in correspondence with the receiving station of said first loading device coming from said second off-loading device through second pneumatic transfer means, from said receiving station to a second washing station, moving said empty case from said second washing station towards said filling station, executing the phase of loading said case with a determined quantity of said product, repeating the following operative cycle for each case transiting from said first loading device to said second off-loading device and vice versa.

4. A method as claimed in claim 2, comprising the completion in succession and in a discrete manner through said second off-loading device, starting from a condition in which the case is full, of an operative cycle comprising the following phases of moving said full case from said arrival station coming from said first loading device towards the first washing station, moving said full case from said first washing station towards said off-loading station, executing the phase of off-loading said case, moving said empty case towards a second washing station, moving said case towards a launch station connected to said second pneumatic transfer means, transferring said empty case towards said first loading device through second pneumatic transfer means, moving said full case, once it has arrived in correspondence with the receiving station of said second off-loading device coming from said first loading device through said first pneumatic transfer means, from said receiving station to said first washing station, repeating the device to said first loading device and vice versa.

5. A method as claimed in claim 1, comprising, after the off-loading phase, the phase of executing an external washing of said empty case in correspondence with a first washing station of said second off-loading device, pneumatically transferring said empty case along a second determined route from said second off-loading device to a receiving station of said first loading device, through second sealed pneumatic transfer means able to connect pneumatically, preventing contact between the case and the external environment, said second off-loading device to said first loading device, executing an external washing of said empty case in correspondence with a second washing station of said first loading device.

6. A method as claimed in claim 1, comprising relative to the loading phase, the phases of opening and closing said stopper of said case, through first opening and closing means comprised in said first loading device arranged and shaped in such a way as to prevent, during the loading phase, contact between the case and the external environment.

7. A method as claimed in claim 1, comprising, relative to the off-loading phase, the phases of opening and closing said stopper of said case, through second opening and closing means comprised in said second off-loading device and arranged and shaped in such a way as to prevent, during the off-loading phase, contact between the case and the external environment.

8. An apparatus for transferring products from a manufacturing unit to a utilizing unit, comprising:

first hermetic feeding means for feeding said product coming from said manufacturing unit inside a hermetic containment case, said case comprising a sealing stopper;

a first loading device comprising at least a filling station, a first washing station for externally washing said case and said sealing stopper wherein said case is full and sealed by said stopper, a launch station and an arrival station for said case;

a second off-loading device comprising at least a station for the arrival of said case when said case is full and a station for opening said case and off-loading said product from inside said case;

first sealed pneumatic transfer means for pneumatically connecting said first loading device to a second off-loading device and for transferring, along a first determined route, said case when full and sealed by said stopper towards said second off-loading device; and, second hermetic means for feeding said product from said second off-loading device to said utilizing unit.

9. An apparatus as claimed in claim 8, wherein said second off-loading device further comprises a first station for externally washing said empty case and a launch station connected to second sealed pneumatic transfer means for pneumatically connecting said first loading device to said second off-loading device and for transferring, along a second determined route, said empty case towards said first loading device in correspondence with said arrival station.

10. An apparatus as claimed in claim 9, wherein said first and second pneumatic transfer means comprise, respectively, a first and a second sealed pipeline provided with respective first and second blowing means able to generate inside each respective pipeline a flow of a fluid necessary for the travel of the case inside each first and second pipeline.

11. An apparatus as claimed in claim 8, wherein said first loading device comprises first means for opening and closing said stopper of said case, said first opening means being positioned in correspondence with said loading station.

12. An apparatus as claimed in claim 11, wherein said first means for opening and closing said first stopper of the case comprise a first tubular chamber coaxial to said loading station, inside said first chamber being positioned a first thruster provided, on its extremity destined to come in contact with the stopper, with a suction cup connected to the respective aspiration means, said thruster being movable between a first raised position towards a second lowered position for drawing the stopper, a third raised position for translating said stopper in a position not interfering with the flow of said product coming from said manufacturing unit through an additional chamber which enters the first chamber, a fourth lowered position for closing the case with the stopper, a fifth raised position for releasing the stopper in its position of closure of the case.

13. An apparatus as claimed in claim 12, wherein said second means for opening and closing said stopper of the case comprise a second tubular chamber coaxial to said loading station, inside said second chamber being positioned a second thruster provided, on its extremity destined to come m contact with the stopper, with a suction cup connected to respective aspiration means, said thruster being movable between a first lowered position towards a second raised position for drawing the stopper, a third lowered position for translating said stopper in a position not interfering with the flow of said product coming from said case and advancing through an additional chamber which starts from the second chamber, a fourth raised position for closing the case with the stopper, a fifth lowered position for releasing the stopper its position of closure of the case.

14. An apparatus as claimed in claim 13, wherein said first and second opening and closing means comprise respective means for thrusting and actuating the case from a rest position to an open and closed position.

15. An apparatus as claimed in claim 8, wherein said second off-loading device comprises second means for opening and closing said stopper of said case, said first opening means being positioned in correspondence with said off-loading station.

16. An apparatus as claimed in claim 8, wherein said first loading device comprises a second washing station for washing said empty case coming from said second off-loading device.

17. An apparatus as claimed in claim 8, wherein said second off-loading device comprises a second washing station for washing said full case coming from said first loading device.

18. An apparatus as claimed in claim 8, wherein said first loading device comprises a first drum able to rotate about a first axis of rotation, said first drum comprising at least a seat for receiving a respective containment case, and being movable cyclically and in succession in intermittent fashion to move said seat housing each case between said loading station, a first washing station, said launch station, and to move said seat, left empty as a result of the phase of launching the full case towards said second off-loading device, from said launch station towards said receiving station to receive a case coming from said second off-loading device, towards a second washing station and towards said filling station.

19. An apparatus as claimed in claim 8, wherein said second off-loading device comprises a second drum able to rotate about a second axis of rotation, said second drum comprising at least a seat for receiving a respective containment case, and being movable cyclically and in succession in intermittent fashion to move said seat housing each full case coming from said first loading device between said receiving station, towards a first washing station, towards said off-loading station, towards a second washing station and towards said launch station, and to move said seat, left empty as a result of the phase of launching the empty case towards said first loading device, from said launch station towards said receiving station to receive a case coming from said first loading device.

20. An apparatus as claimed in claim 19, wherein said second drum comprises an exterior frame for supporting a first inferior disk and a second superior disk mutually distanced, parallel and lying on respective planes of lay positioned orthogonal to said second axis of rotation, each first and second disk including said seat between them; said stations being positioned angularly equidistant about said first axis of rotation.

21. An apparatus as claimed in claim 19, wherein said first and second drums are movable in phase relative to each other and in phase relative to the respective first and second pneumatic transfer means.

22. An apparatus as claimed in claim 19, wherein for said first loading device and for said second off-loading device said first and second washing stations comprise respective means for conveying a washing fluid or liquid inside said seat.

23. An apparatus as claimed in claim 19, comprising, for each first and second device a plurality of said seats so as to handle cyclically a plurality of said cases transiting from said first loading device towards said second off-loading device, and so as to move in succession a plurality of said cases between the various loading, off-loading, washing, arrival and launch stations.

24. An apparatus as claimed in claim 18, wherein said first drum comprises an exterior frame supporting a first inferior disk and a second superior disk mutually distanced, parallel and lying on respective planes of lay positioned orthogonal to said first axis of rotation, each first and second disk including said seat between them; said stations being positioned angularly equidistant about said first axis of rotation.

25. A method for transferring products from a manufacturing unit to a packaging unit, said method comprising:

using a first hermetically sealed feeding device to feed a select quantity of product from a manufacturing unit into a hermetically sealed loading device while preventing contact between the select quantity of product and an external environment;

inside said hermetically sealed loading device, placing said select quantity of product into a containment case;

hermetically sealing said containment case to provide a hermetically sealed full containment case;

pneumatically transferring said hermetically sealed full containment case to a hermetically sealed off-loading device that is spaced from said loading device;

opening said sealed full containment case inside said hermetically sealed off-loading device;

inside said hermetically sealed off-loading device, transferring said select quantity of product from said containment case to a second hermetically sealed feeding device; and, using said second hermetically sealed feeding device to transfer said select quantity of product from said hermetically sealed off-loading device to a utilizing unit.

26. The method as set forth in claim 25, wherein said step of hermetically sealing said containment case to provide a hermetically sealed full containment case comprises sealing said containment case with a stopper; said method further comprising:

externally washing said sealed full containment case and said stopper.

* * * * *